United States Patent [19]

Tiemann

[11] 4,108,228
[45] Aug. 22, 1978

[54] VEHICLE WHEEL WITH RUBBER TIRE

[75] Inventor: Reinhard Tiemann, Hemmingen, Fed. Rep. of Germany

[73] Assignee: Continental Gummi-Werke Aktiengesellschaft, Hannover, Fed. Rep. of Germany

[21] Appl. No.: 635,662

[22] Filed: Nov. 26, 1975

[30] Foreign Application Priority Data

Nov. 29, 1974 [DE] Fed. Rep. of Germany ....... 2456420

[51] Int. Cl.$^2$ ............................................... B60B 9/10
[52] U.S. Cl. ........................................... 152/7; 152/41; 152/47; 152/246; 152/324; 152/380; 152/405
[58] Field of Search ..................................... 301/97–98; 152/5, 7, 31, 47–48, 50–51, 246, 323–325, 327, 380, 381 R, 379 R, 362 R, 405, 41, 49–50

[56] References Cited

U.S. PATENT DOCUMENTS

| 576,352 | 2/1897 | Sparre | 152/325 |
| 600,781 | 3/1898 | Gunther | 152/325 X |
| 1,186,472 | 6/1916 | Estes | 152/325 |
| 2,291,959 | 8/1942 | Goodrich | 152/41 X |
| 4,034,790 | 7/1977 | Johannsen et al. | 152/379.1 X |

FOREIGN PATENT DOCUMENTS

| 735,128 | 3/1943 | Fed. Rep. of Germany | 152/323 |
| 1,218,302 | 6/1966 | Fed. Rep. of Germany | 152/47 |
| 549,423 | 10/1956 | Italy | 152/49 |
| 1,035,614 | 7/1966 | United Kingdom | 152/49 |
| 19,502 of | 1896 | United Kingdom | 152/327 |
| 5,817 of | 1911 | United Kingdom | 152/47 |

*Primary Examiner*—Robert B. Reeves
*Assistant Examiner*—Charles A. Marmor
*Attorney, Agent, or Firm*—Walter Becker

[57] ABSTRACT

A vehicle wheel equipped with an annular solid rubber tire having its marginal portions provided with beads resting in and held by lateral wheel flanges. The rubber tire extends around an annular channel into which the tire can partially deflect. The wheel flanges are spreadable away from each other by spring tension.

11 Claims, 3 Drawing Figures

VEHICLE WHEEL WITH RUBBER TIRE

The present invention relates to a vehicle wheel equipped with an annular, solid rubber tire which has beads on its lateral marginal portions and which surrounds an annular deflection space or clearance provided in a rim. The tire is confined at its beads by wheel flanges of the rim.

With heretofore known vehicle wheels of this type, the tread area of the solid rubber tire will, in addition due to deformation by pressure, also due to a shearing deformation of the zones between the tread area and the beads enter said deflection space. The shearing deformation in this connection is increasingly superimposed by a compression deformation which presses the beads with increasing force against the wheel flanges. Should the high deflection stroke or flattening characteristic of such a wheel be reduced because of an increase in the bead distance, the beads can be held securely in position only by a costly adhesion to the wheel flanges.

In order to hold the beads, also wheel flanges embracing same are used which are additionally provided with screws which penetrate the beads (U.S. Pat. No. 1,577,627). During the flattening or deflecting of the tread area, depending on the arrangement of the beads, at least in the end phase, primarily pull stresses occur. These stresses considerably increase the width of that portion which is located under the tread area.

It is an object of the present invention to avoid or eliminate to a great extent a stretching of the tread area or its parts during a large stroke displacement or deflection of the respective tread area while avoiding the above described drawbacks.

It is a further object of the present invention to achieve a relatively even flattening characteristic.

These and other objects and advantages of the present invention will appear more clearly from the following specification in connection with the accompanying drawing in which.

Figure 1:
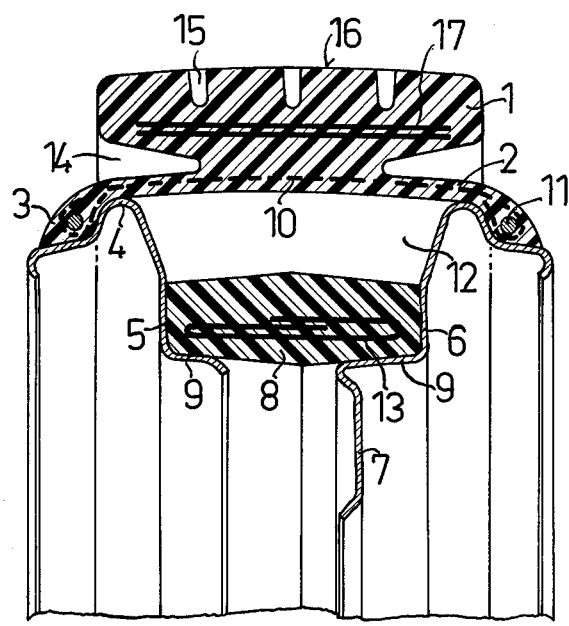
FIG. 1 shows a section of a vehicle wheel according to the present invention with the wheel body firmly arranged or mounted on a portion of the rim.

The vehicle wheel of the present invention is characterized primarily in that the wheel flanges, which act upon the beads by means of spring tension, are arranged so that they are expandable or spreadable in axial direction. The beads core, which are provided in a known way with a pull resistant or non-expandable bead, are expediently arranged on the outside of the wheel flanges. The bead cores are connected by a carcass of pull resistant layers which, in the finished state, are stretched from wheel flange to wheel flange. For purposes of entering the stroke or deflection space, the axial elasticity of the tread area or the carcass, which elasticity results from the construction of the latter, is taken advantage of. The possibility of the wheel flanges drawing near to one another against a force trying to spread them is also taken advantage of in the course of the hardening caused by the further flattening or deflection. It is an objective to have the expandability of the carcass adequate for the wheel load and to keep small the possibility that the wheel flanges will approach each other. Since the beads and bead cores are situated outside of the wheel flanges, strong spreading forces can be brought to bear. The stroke space of the rim operates advantageously for mounting the carcass since it can be utilized like a well base of a common rim to pull the one bead over the entire rim.

In order to further strengthen the desired stroke or flattening with a flat characteristic, as a further development of the present invention, the tread area or tread ring which forms the tire and encircles the carcass, is provided on both sides with annular grooves whose cross sections taper toward one another. The load to be absorbed by the wheel is first guided by the grooves towards the middle of the membrane-like stretched carcass so that the forces are absorbed only by the bulging of the carcass. Only at the end of this flattening do the edges of the tread area rest upon that part of the carcass which is located in the area of the wheel flanges so that the flattening process, rather than being abruptly terminated, is stopped by a gradually increased progression due to the small surface area.

The rim is expediently built up so that the wheel flanges are arranged on axially spreadable rim sections which are supported one into the other so that the wheel flanges are firmly connected with the rim sections and the rim sections are mounted so as to be axially movable. As an especially advantageous embodiment of the present invention, the rim sections are only arranged next to one another, and are connected to each other by an elastomeric annular or ring-like body. In addition to handling the stroke or flattening, the ring-like body connects the rim sections. In this connection, the ring-like body may have inserts or layers to prevent or reduce the radial displacement of the rim sections if this feature, which generally is deemed advantageous, is to be prevented or reduced for some reasons.

The rim sections and the wheel body are also expediently connected to each other by means of an elastomeric ring-like body. Both rim sections thereby have a spring possibility in relation to the ring-like body. If the arrangement is such that the ring-like body embraces the wheel body and is itself at least partially embraced by the angled-off portions of the rim extensions, a single ring-like body suffices to elastically connect the two rim sections together and to also be connected to the wheel body. If the elastic ring-like body interconnects only the two rim sections, the ring-like body expediently embraces angled-off portions of the rim sections.

Referring now to the drawings in detail, the solid rubber tire of FIG. 1 comprises a tread area 1, a carcass 2, and beads 3. The tire is seated on wheel flanges 4 of the rim sections 5 and 6, one of which is connected with a wheel body 7. The rim sections 5 and 6 are connected to one another by a ring-like or annular body 8, which is secured against radial displacement by the bends or angled-off portions 9.

The ring-like body 8 experiences compression stresses in the axial direction while the carcass 2 encounters tensile stresses. The forces in the carcass 2 are absorbed by inserted strength carriers 10, which in turn are connected to the bead cores 11 of the beads 3. These bead cores 11 prevent a radial expansion of the beads 3 and thereby a sliding off from the wheel flanges 4.

To mount the carcass 2, a bead 3 is first pushed over one wheel flange 4 into a quasi well base in the form of a stroke or deflecting space 12. The bead 3 which is in the space 12 can then be pushed out over the other wheel flange 4. It is necessary, however, to prestress or preload the ring-like body 8 in axial direction so that the distance between the wheel flanges 4 is less than the distance between the beads 3. After pulling the bead 3 over the other outer side of the rim, the ring-like body 8, which stresses the carcass 2 in an axial direction, is released. Radial displacements of the rim sections 5 and 6 towards one another can be eliminated or reduced by means of a belt 13 inserted into the ring-like body 8.

In addition, annular grooves 14 are provided between the tread area 1 and the carcass 2. The cross sections of the grooves 14 taper in the direction towards the central plane of the tire, at a right angle to the tire axis. During flattening of the tire, therefore, the tread area 1 draws progressively closer to the carcass 2 in the vicinity of the grooves 14, so that the spring characteristic in the first part during deflection of the carcass 2 makes little progress; when the tread area 1 joins or abuts the carcass 2, there occurs a high progress in the spring characteristic; the greatest spring characteristic is achieved after completion of the abutting process, which occurs immediately when the tread area 1 presses upon the wheel flanges 4.

The tread area 1 also has recesses 15 to form a profile on its road contact or tread surface 16 and may also be reinforced by strength carriers 17.

Figure 2:
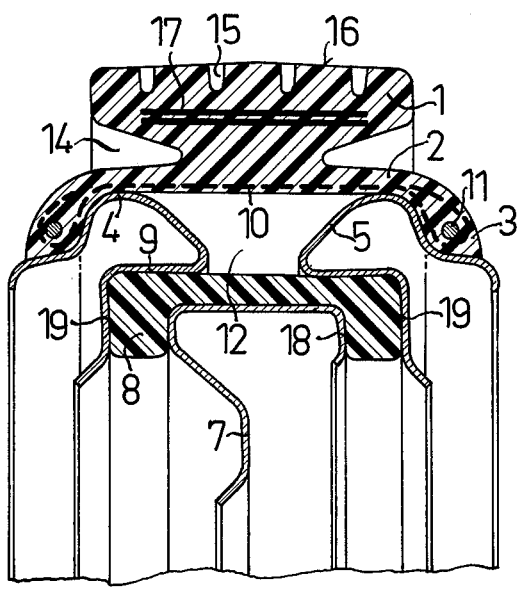
FIG. 2 shows a wheel body which relative to the two rim portions is elastically mounted.

The specific embodiment of FIG. 2 shows a separate arrangement of the wheel body 7. The bends 9 of the rim sections 4, 5 are turned outwardly and embrace the elastomeric ring-like body 8, into which the wheel body 7 is placed. In contrast to the configuration of FIG. 1, the ring-like body 8 has radially inwardly directed ribs which lie between corresponding bends 19 of the rim sections 5, 6 and shoulders 18 of the wheel body 7. These ribs provide for rigidity of the carcass 2 during axial compression or stress.

Figure 3:
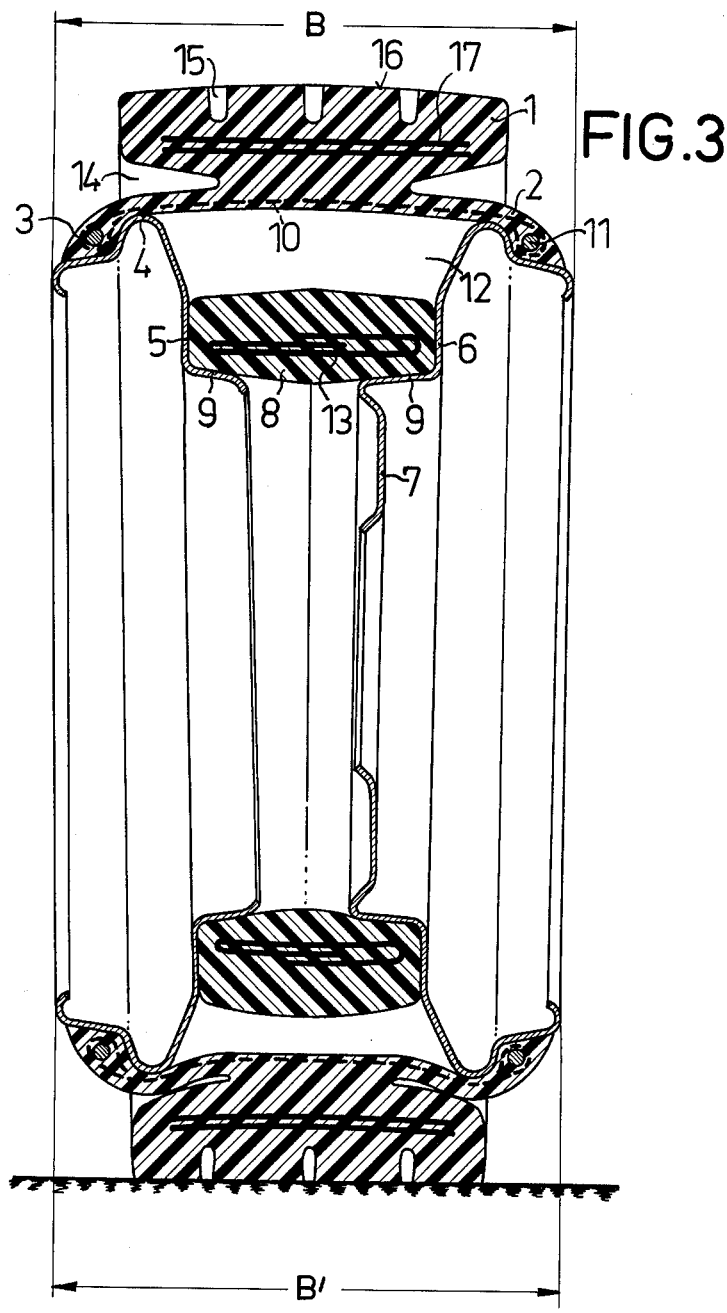
FIG. 3 shows a section of a vehicle wheel having features in accordance with the present invention.

FIG. 3 shows a vehicle wheel with a tire thereon in a deflected state whereby axial spacing B of both rim discs is reduced accordingly by a nominal amount to B'.

It is, of course, to be understood that the present invention is by no means limited to the specific showing in the drawing but also comprises any modifications within the scope of the appended claims.

What is claimed is:

1. In combination:
a vehicle wheel comprising a split rim having separate independent rim discs without rigid connection to each other, each rim disc having lateral wheel flanges axially spaced from each other for receiving tire beads radially outwardly thereon and also having rim extensions respectively connected to and directed radially inwardly from said wheel flanges and defining with each other an annular space extending radially inwardly therebetween with regard to the largest diameter surface of said wheel flanges;
a solid rubber tire having beads resting radially on the axial outside of, and held respectively by, said lateral wheel flanges, said wheel flanges exerting outwardly directed axial forces upon said beads by means of spring tension, and said tire exerting inwardly directed axial forces on said rim discs, said tire extending across said annular space and being adapted to be partially deflected thereinto during springing-in of said tire; and
additional intermediate coaxial means located between said rim discs and radially inwardly between said wheel flanges for supporting and detachably connecting said rim discs and for resisting said inwardly directed axial forces of said tire, said solid rubber tire and said additional intermediate coaxial means being individual parts which are assembled together safely under tensile and pressure forces into a functional unit without the necessity of any bonding connections, said tire and said coaxial means being suitably capable of being taken apart again for interchange and replacement purposes.

2. An arrangement in combination according to claim 1, in which said tire beads are provided with substantially non-extensible bead cores and are arranged on the outside of said wheel flanges.

3. An arrangement in combination according to claim 2, in which said tire includes a carcass extending from wheel flange to wheel flange and having strength carriers embedded therein connected to and interconnecting said bead cores.

4. An arrangement in combination according to claim 3, in which said tire includes a tread ring surrounding said carcass and being connected thereto, said tread ring having both sides thereof provided with annular grooves decreasing in cross section in the direction toward each other.

5. An arrangement in combination according to claim 1, in which said extensions are resiliently spreadable in the axial direction of said wheel.

6. An arrangement in combination according to claim 5, in which said additional intermediate coaxial means comprises an annular elastomeric body interposed between and interconnecting said extensions.

7. An arrangement in combination according to claim 6, in which said annular elastomeric body comprises stiffening insert means for preventing said extensions from being offset radially with regard to each other.

8. An arrangement in combination according to claim 6, which includes a wheel body arranged radially inwardly of said annular channel, and in which said extensions are connected to said wheel body by said annular elastomeric body.

9. An arrangement in combination according to claim 8, in which the annular elastomeric body extends around said wheel body and is partly surrounded by said extensions.

10. An arrangement in combination according to claim 6, in which said extensions have angled off portions extending toward each other and forming supporting means for said annular elastomeric body.

11. An arrangement in combination according to claim 6, in which said extensions include angled off sections angled off in opposite directions with regard to each other, and which includes a wheel body arranged radially inwardly of said annular channel in radially spaced relationship thereto and having its outer periphery forming an annular supporting surface, and an annular elastomeric body clamped-in between said last mentioned angled off sections and said peripheral annular supporting surface of said wheel body while partially surrounding said annular supporting surface.

* * * * *